United States Patent
Liu et al.

(10) Patent No.: US 9,350,247 B2
(45) Date of Patent: May 24, 2016

(54) SWITCH CONTROL CIRCUIT, SINGLE-INDUCTOR-DUAL-OUTPUT (SIDO) CONTROL METHOD AND SINGLE-INDUCTOR-DUAL-OUTPUT (SIDO) CONVERTER APPLYING THE SAME

(71) Applicant: ILI TECHNOLOGY CORPORATION, Jhubei, Hsinchu County (TW)

(72) Inventors: Wen-Kuen Liu, Jhubei (TW); Ming-Hung Chien, Hsinchu (TW); Sheng-Hsiang Chiang, Hsinchu (TW)

(73) Assignee: ILI TECHNOLOGY CORPORATION, Jhubei (TW)

( * ) Notice: Subject to any disclaimer, the term of this patent is extended or adjusted under 35 U.S.C. 154(b) by 325 days.

(21) Appl. No.: 14/190,624

(22) Filed: Feb. 26, 2014

(65) Prior Publication Data
US 2014/0239720 A1      Aug. 28, 2014

(30) Foreign Application Priority Data
Feb. 27, 2013   (CN) ............... 2013 1 0062292

(51) Int. Cl.
| H02J 1/00 | (2006.01) |
| H02J 3/14 | (2006.01) |
| H02M 3/158 | (2006.01) |
| H02M 1/00 | (2006.01) |

(52) U.S. Cl.
CPC ...... *H02M 3/1582* (2013.01); *H02M 2001/009* (2013.01); *Y10T 307/406* (2015.04)

(58) Field of Classification Search
CPC ............. H02M 3/1582; H02M 2001/009; Y10T 307/406
USPC .......................................................... 307/31
See application file for complete search history.

(56) References Cited

U.S. PATENT DOCUMENTS

| 2007/0075689 A1* | 4/2007 | Kinder ............. H02M 3/1582 323/259 |
| 2013/0249507 A1* | 9/2013 | Kim ............... H02M 3/1563 323/247 |

* cited by examiner

*Primary Examiner* — Rexford Barnie
*Assistant Examiner* — Toan Vu
(74) *Attorney, Agent, or Firm* — Nixon & Vanderhye P.C.

(57) ABSTRACT

A switch control circuit includes a processor computing an on-time ratio based on an input voltage value, a first output voltage value, and a second output voltage value. The processor further computes an on-time sum based, on an output current value, an inductance value, the input voltage value, the first output voltage value and the second output voltage value, and further computes an operation frequency value that corresponds to the on-time sum. The processor further computes on-time values of a boost mode and a buck-boost mode based on the on-time sum and the on-time ratio. The processor controls a signal generator based on the operation frequency value, the on-time value of the boost mode and the on-time value of the buck-boost mode.

18 Claims, 8 Drawing Sheets

| the processor further computes, based on the maximum output current value of the boost mode, the inductance value, the input voltage value, the first output voltage value, and the boost mode period ratio, a lower boundary equation of the boost mode in which an operation frequency value varies with the on-time. | 841 |
|---|---|

| the processor further computes, based on the maximum output current value of the buck-boost mode, the inductance value, the input voltage value, the second output voltage value, and the boost mode period ratio, a lower boundary equation of the buck-boost mode in which an operation frequency value varies with the on-time. | 842 |

| the processor computes, based on the input voltage value, the first output voltage value, and the boost mode period ratio, an upper boundary equation of the boost mode in which operation frequency value varies with the on-time | 843 |

| the processor computes, based on the input voltage value, the second output voltage value, and the boost mode period ratio, an upper boundary equation of the buck-boost mode in which an operation frequency value varies with the on-time. | 844 |

| the processor further stores an upper limit of the on-time that is related to a current saturation limit of the inductor, the processor further computes conversion power values of a range of value sets according to a conversion power algorithm, the range of value sets being defined by the lower boundary equation of the boost mode, the lower boundary equation of the buck-boost mode, the upper boundary equation of the boost mode, the upper boundary equation of the buck-boost mode and the upper limit of the on-time, and the processor selects the value set having the highest conversion power for the on-time sum and the operation frequency value. | 845 |

SWITCH CONTROL CIRCUIT, SINGLE-INDUCTOR-DUAL-OUTPUT (SIDO) CONTROL METHOD AND SINGLE-INDUCTOR-DUAL-OUTPUT (SIDO) CONVERTER APPLYING THE SAME

CROSS-REFERENCE TO RELATED APPLICATION

This application claims priority of Chinese application no. 201310062292.7, filed on Feb. 27, 2013.

BACKGROUND OF THE INVENTION

1. Field of the Invention

The present invention relates to a switch control circuit, a single-inductor-dual-output (SIDO) control method and a SIDO converter applying the same.

2. Description of the Related Art

In the field of liquid crystal displays (LCD), there is a demand for a larger screen size and a higher-resolution. The technique for driving an increasing number of pixels is becoming more important. Additionally, since there is an increasing demand for smaller and more portable devices, the size of the electronic circuit has to be reduced.

SUMMARY OF THE INVENTION

The object of the present invention is to provide a switch control circuit that employs digital control by computing an operation frequency and an on-time.

According to one aspect of the present invention, there is provided a switch control circuit adapted, for a single-inductor-dual-output (SIDO) converter that is operable to switch between a boost mode and a buck-boost mode. The SIDO converter receives an input voltage and outputs a first output voltage and a second output-voltage. The SIDO converter includes an inductor, a first switch controlled by a first control signal and a second switch controlled, by a second control signal. The switch control circuit includes a signal generator and a processor.

The signal generator generates the first control signal used to control the first switch to switch between an on-state and an off-state, and generates the second control signal used to control the second switch to switch between an on-state and an off state.

The processor is electrically coupled with the signal generator and computes an on-time ratio based on an input voltage value related to the input voltage, a first output voltage value related to the first output voltage, and a second output voltage value related to the second output voltage, wherein the on-time ratio is related to an on-time of the boost mode and an on-time of the buck-boost mode.

The processor has an output current value and an inductance value stored therein, computes an on-time sum based on the output current value, the inductance value, the input voltage value, the first output voltage value and the second output voltage value, and further computes an operation frequency value that corresponds to the on-time sum, wherein the on-time sum is substantially equal to a sum of the on-time of the boost mode and the on-time of the buck-boost mode.

The processor further computes an on-time value of the boost mode and an on-time value of the buck-boost mode based on the on-time sum and the on-time ratio.

The processor controls the signal generator based on the operation frequency value, the on-time value of the boost mode and the on-time value of the buck-boost mode, such that frequency and duty on-state ratio of the first control signal are related to the operation frequency value and the on-time value of the boost mode, respectively and such that frequency and duty on-state ratio of the second control signal are related to the operation frequency value and the on-time value of the buck-boost mode, respectively.

Another object of the present invention is to provide a single-inductor-dual-output (SIDO) converter that employs digital control by computing an operation frequency and an on-time.

According to another aspect of the present invention, the single-inductor-dual-output (SIDO) converter that is operable to switch between a boost mode and a buck-boost mode includes an output circuit and the above-mentioned switch control circuit.

The output circuit includes a first output terminal for outputting a first output voltage, a second output terminal for outputting a second output voltage, an inductor electrically coupled with the first output terminal and the second output terminal, a first switch electrically coupled with the first output terminal, and a second switch, electrically coupled with the second output terminal and disposed to receive an input, voltage.

A further object of the present invention is to provide a single-inductor-dual-output (SIDO) control method that is applied in the above-mentioned SIDO converter.

According to a further aspect of the present invention, the single-inductor-dual-output (SIDO) control method includes the following steps:

(A) computing an on-time ratio based on an input voltage value, a first output voltage value and a second output voltage value, wherein the on-time ratio is related to an on-time of a boost mode and an on-time of a buck-boost mode;

(B) computing an on-time sum based on a stored output current value, a stored inductance value, the input voltage value, the first output voltage value and the second output, voltage value, and computing an operation frequency value that corresponds to the on-time sum, wherein the on-time sum is substantially equal to a sum of the on-time of the boost mode and the on-time of the buck-boost mode; and (C) computing an on-time value of the boost mode and an on-time value of the buck-boost mode based on the on-time sum and the on-time ratio.

BRIEF DESCRIPTION OF THE DRAWINGS

Other features and advantages of the present invention will become apparent in the following detailed description of the preferred embodiment with reference to the accompanying drawings, of which:

FIG. 4 is a flow chart illustrating further-details of a step 84 in the SIDO control method;

DETAILED DESCRIPTION OF THE PREFERRED EMBODIMENTS

Figure 1:
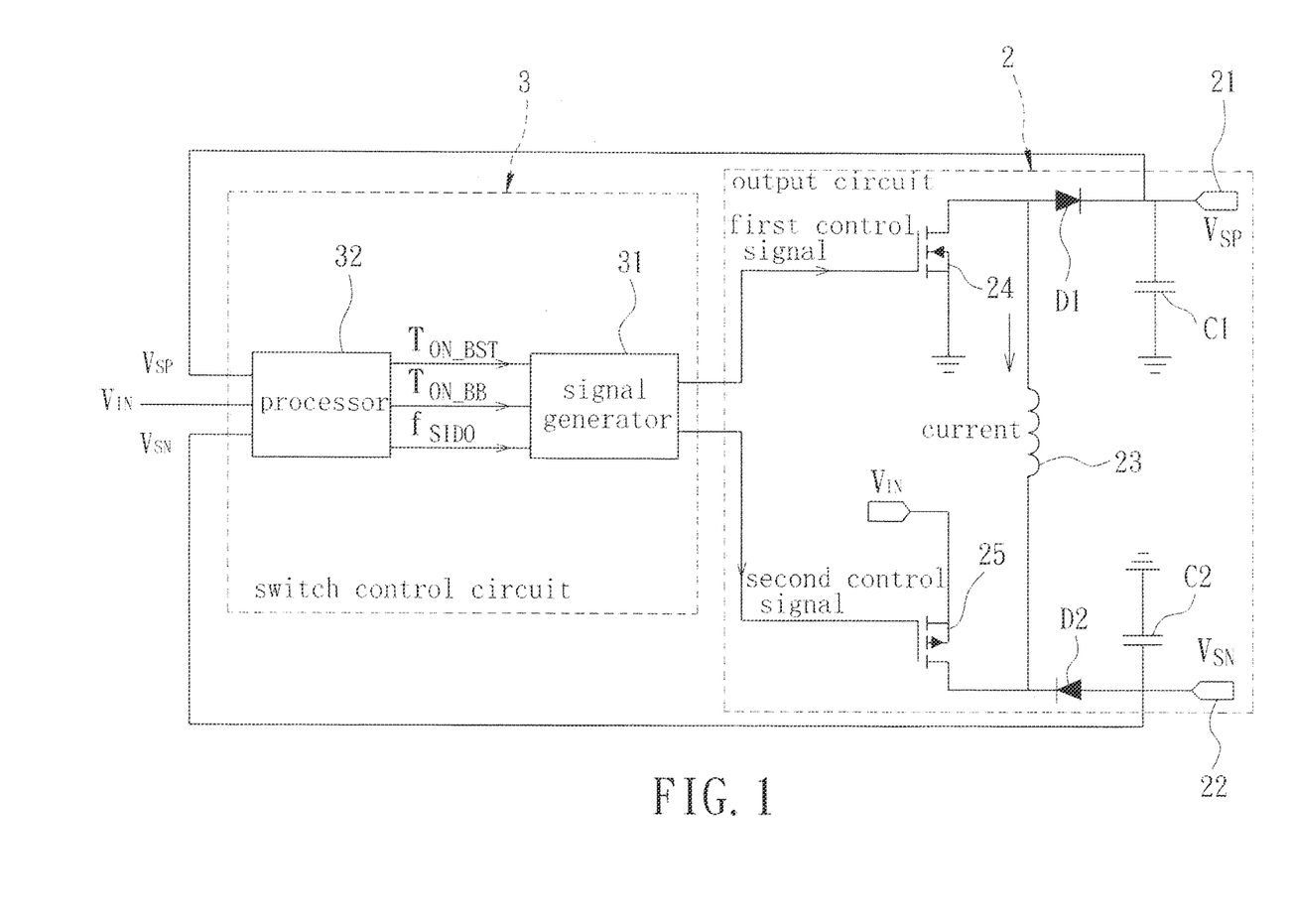
FIG. 1 is a schematic circuit diagram of a single-inductor-dual-output (SIDO) converter according to a preferred embodiment of the present invention.

Referring to FIG. 1, a single-inductor-dual-output converter of a preferred embodiment of the present invention that is capable of switching between a boost mode and a buck-boost mode includes an output circuit 2 and a switch control circuit 3.

The output circuit 2 includes a first output terminal 21 for outputting a first output voltage Vsp, a second output terminal 22 for outputting a second output voltage $V_{SN}$, an inductor 23 electrically coupled with the first output terminal 21 and the second output terminal 22, a first switch 24 electrically coupled with the first output terminal 21, a second, switch 25 electrically coupled with the second output terminal 22 and disposed to receive an input voltage $V_{IN}$, a first diode D1, a second diode D2, a first output capacitor C1, and a second output capacitor C2. The first switch 24 is controlled by a first control signal to be switched between an on-state and an off-state, and the second switch 25 is controlled by a second control signal to be switched between an on-state and an off-state.

The first diode D1 has an anode electrically coupled with the first switch 24 and a cathode electrically coupled with the first output terminal 21.

The second diode D2 has an anode electrically coupled with, the second output, terminal 22, and a cathode electrically coupled with the second switch 25.

The first output capacitor C1 is electrically coupled between the first output terminal 21 and ground.

The second output capacitor C2 is electrically coupled between the second output terminal 22 and ground.

The switch control circuit 3 includes a signal generator 31 and a processor 32.

The signal generator 31 is controlled to generate the first control signal and the second control signal.

The processor 32 is electrically coupled to the signal generator 31 and the output circuit 2, and stores an output current value, an inductance value, and an upper limit of an on-time. The output current value includes a maximum output current value $I_{BST}$ of the boost mode and a maximum output current value $I_{BB}$ of the buck-boost mode.

Conventionally, there exists a large resistance in a conduction interface between a thin film transistor liquid crystal display and a flexible printed circuit board (FPC), and thus a current control mode is not suitable to be applied here. Therefore, this embodiment operates in a discontinuous-conduction-mode (DCM) to prevent cross regulation. In order to reduce output-ripples, the boost mode and the buck-boost mode must-interlace, i.e., as soon as the electrical energy is stored and released, during the boost mode, the inductor 23 must, operate in the buck-boost mode for replenishing energy stored in the output capacitors.

$T_{BST}$ is defined to be a period of the boost mode, and $T_{BB}$ is defined to be a period or the buck-boost, mode. In DCM mode, equations 1 and 2 can be derived:

$$T_{BST}=T_{ON\_BST}+T_{OFF\_BST}+T_{IDL\_BST} \quad (1)$$

$$T_{BB}=T_{ON\_BB}+T_{OFF\_BB}+T_{IDL\_BB} \quad (2)$$

Figure 2:
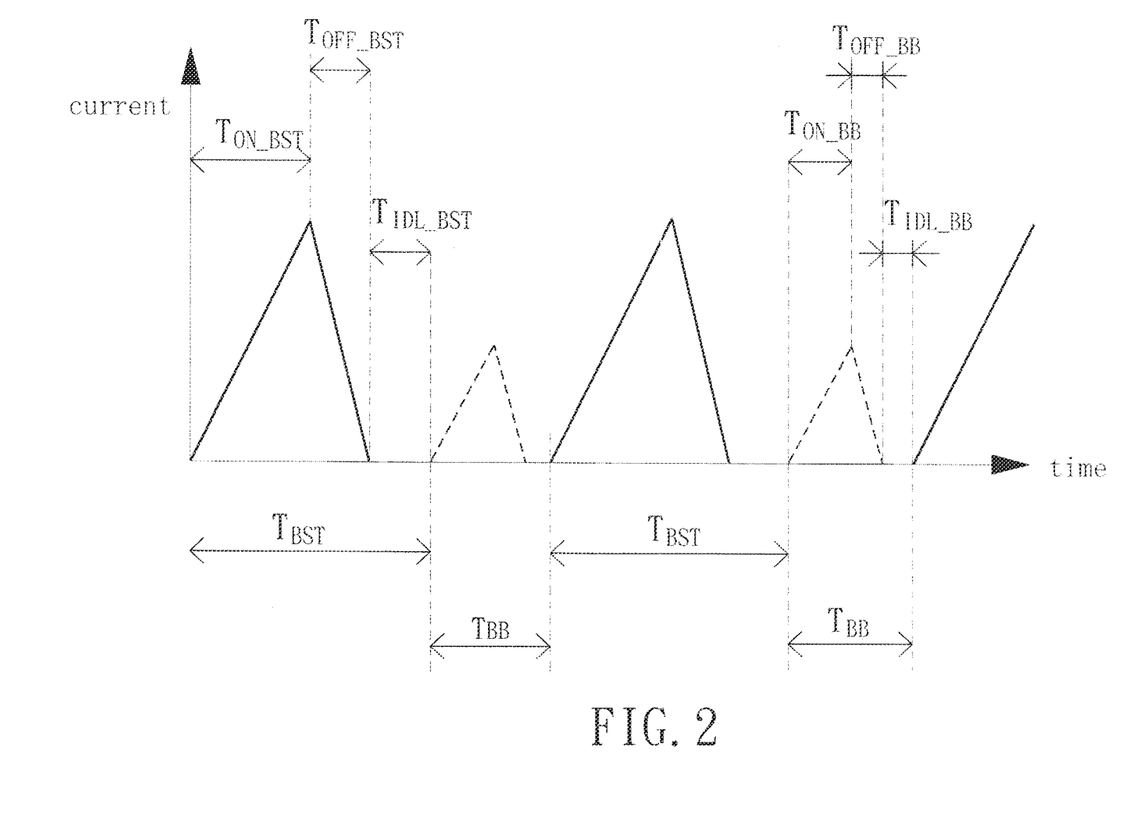
FIG. 2 is a waveform diagram showing current flowing through an inductor versus time.

$T_{ON\_BST}$ is an on-time of the boost mode (on-time of the switch), $T_{ON\_BB}$ is an on-time of the buck-boost mode (on-time of the switch), $T_{OFF\_BST}$ is an off-time of the boost mode (the diodes allowing current to flow through), $T_{OFF\_BB}$ is an off-time of the buck-boost, mode (the diodes allowing current to flow through), $T_{IDL\_BST}$ is a period that, the current flowing through the inductor 23 is zero during the period of the boost mode, and $T_{IDL\_BB}$ is a period that the current flowing through the inductor 23 is zero during the period of the buck-boost mode. According to equations (1) and (2), the current versus time graph of the inductor 23 is shown in FIG. 2.

In order to achieve volt-second balance of the inductor 23, equations (3) and (4) must be satisfied:

$$T_{OFF\_BST}=T_{ON\_BST} \cdot V_{IN}/(V_{SP}-V_{IN}) \quad (3)$$

$$T_{OFF\_BB}=T_{ON\_BB} \cdot V_{IN}/V_{SN} \quad (4)$$

$V_{IN}$ is the input voltage that is normally supplied by a battery (such as a lithium battery), $V_{SP}$ is the first output voltage (the positive output voltage of the boost mode), and $V_{SN}$ is the second output voltage (the negative output voltage of the buck-boost mode).

In order to achieve charge balance in the output capacitors during the off-time $T_{OFF\_BST}$ of the boost mode and the off-time $T_{OFF\_BB}$ of the buck-boost mode, a boost mode frequency $f_{BST}$ and a buck-boost mode frequency $f_{BB}$ can be derived for different load currents $I_{BST}$ as:

$$f_{BST} = \frac{1}{T_{BST}} = \frac{2I_{BST}L \cdot (V_{SP} - V_{IN})}{T_{ON\_BST}^2 V_{IN}^2} \quad (5)$$

$$f_{BB} = \frac{1}{T_{BB}} = \frac{2I_{BB}L \cdot V_{SN}}{T_{ON\_BB}^2 V_{IN}^2} \quad (6)$$

L is the inductance value of the inductor 23 in the circuit. By following equations (3) to (6), one may choose to control either the on-time or the operation frequency for the given input voltage $V_{IN}$, first output voltage $V_{SP}$, second output voltage $V_{SN}$ and the inductance L. Constant on-time pulse-skip control technique is utilized here. This is a type of pulse-frequency-modulation technique that skips pulses according to ripples in an output voltage. This technique provides stability and can be implemented digitally with relative ease.

Figure 3:
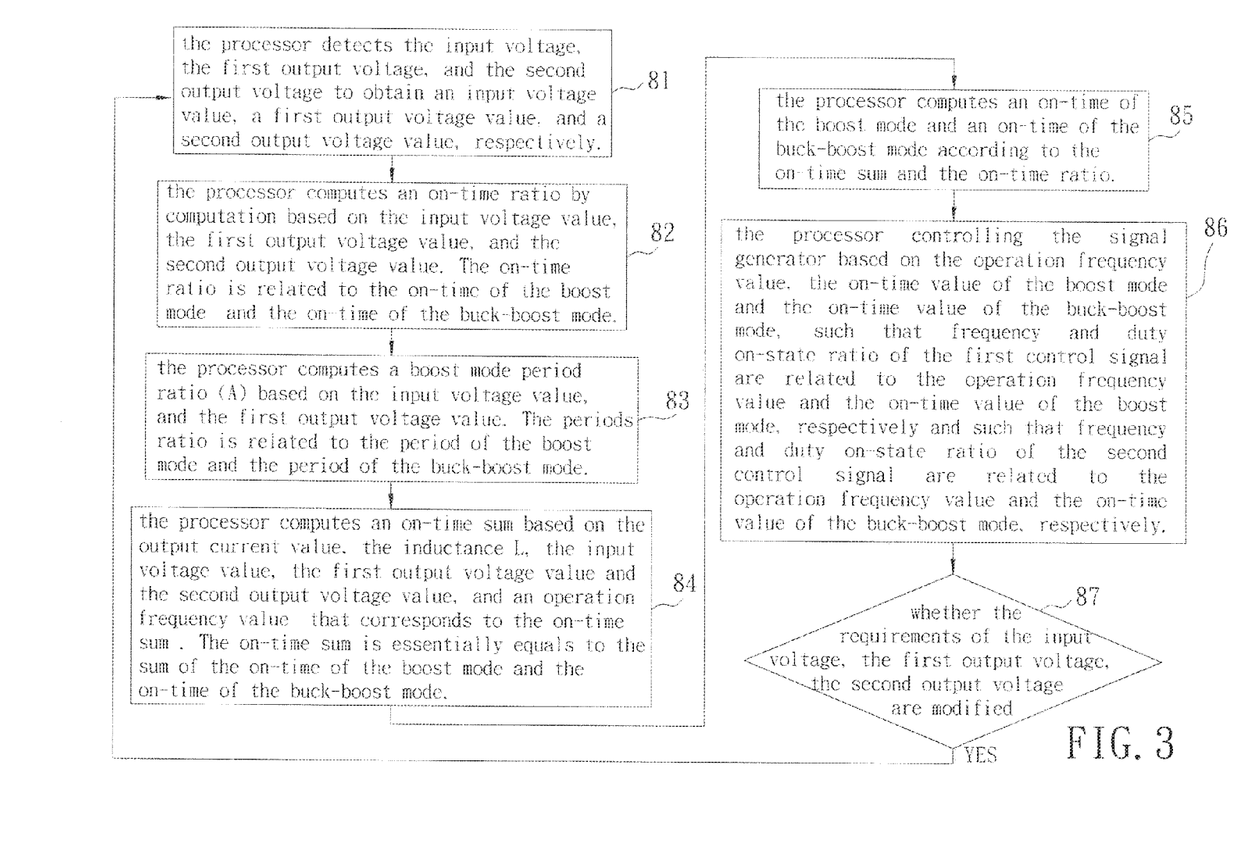
FIG. 3 is a flow chart illustrating a SIDO control method.

The single-inductor-dual-output converter is configured, to implement a single-inductor-dual-output control method, as shown in FIG. 3, which, includes the following steps:

Step 81: the processor 32 detects the input voltage $V_{IN}$, the first output voltage $V_{SP}$, and the second output voltage $V_{SN}$ to obtain an input voltage value, a first output voltage value, and a second output voltage value, respectively.

Step 82: the processor 32 computes an on-time ratio based on the input voltage value, the first, output, voltage value, and the second output voltage value. The on-time ratio is related to the on-time $T_{ON\_BST}$ of the boost mode and the on-time $T_{ON\_BB}$ of the buck-boost mode.

The equation (7) of the on-time ratio is:

$$\frac{T_{ON\_BST}}{T_{ON\_BB}} = \sqrt{\frac{V_{SP} - V_{IN}}{|V_{SN}|}} \quad (7)$$

Under the same voltages and load, the efficiency of the buck-boost mode is lower than that of the boost mode. Therefore, the periods $T_{BST}$ and $T_{BB}$ of the boost mode and buck-boost mode should be adjustable in order to compensate for the difference in the efficiencies of these two modes.

Step 83: the processor 32 computes a boost mode period ratio (A) based on the input voltage value and the first output voltage value. The boost mode period ratio is related to the period $T_{BST}$ of the boost mode and the period $T_{BB}$ of the buck-boost mode. The equations of the boost mode period ratio (A) are shown in (8).

$$A = \frac{T_{BST}}{T_{BST} + T_{BB}}, \text{ and} \qquad (8)$$

$$\frac{T_{BST}}{T_{BB}} = \frac{T_{ON\_BST} + T_{OFF\_BST}}{T_{ON\_BB} + T_{OFF\_BB}} = \frac{V_{SP}^{3/2}}{(V_{SP} + V_{IN})\sqrt{V_{SP} - V_{IN}}}$$

In order to achieve the maximum utilization of the inductor 23 in this preferred embodiment, the converter operates in a boundary mode in order to achieve the best output capability. Since it is difficult for the circuit to perform roots and power computation, a lookup table can be used to cover the range of values of the input voltage and the first output voltage.

Step 84: the processor 32 computes an on-time sum based on the output current value, the inductance value L, the input voltage value, the first output voltage value and the second output voltage value, and an operation frequency value $f_{SIDO}$ that corresponds to the on-time sum. The on-time sum is substantially equal to the sum of the on-time $T_{ON\_BST}$ of the boost mode and the on-time $T_{ON\_BB}$ of the buck-boost mode.

Step 84 includes the following sub-steps, as shown in FIG. 4:

Sub-step 841: the processor 32 further computes, based on the maximum output current value $I_{BST}$ of the boost mode, the inductance value L, the input voltage value, the first output voltage value, and the boost mode period ratio A, a lower boundary equation (9) of the boost mode in which, an operation frequency value $f_{SIDO}$ varies with the on-time.

$$f_{SIDO} \geq f_{BST} = \frac{2I_{BST}L \cdot (V_{SP} - V_{IN})}{A \cdot T_{ON\_BST}^2 V_{IN}^2} \qquad (9)$$

Sub-step 842: the processor 32 further computes, based on the maximum output current value $I_{BB}$ of the buck-boost mode, the inductance value L, the input voltage value, the second output voltage value, and the boost mode period ratio A, a lower boundary equation (10) of the buck-boost mode in which an operation frequency value $F_{SIDO}$ varies with the on-time.

$$f_{SIDO} \geq f_{BB} = \frac{2I_{BB}L \cdot |V_{SN}|}{(1-A) \cdot T_{ON\_BB}^2 V_{IN}^2} \qquad (10)$$

As shown in equations (9) and (10), due to the application of pulse-skip control technique, the operation frequency value $f_{SIDO}$ must be greater than a regulation frequency. When the load is at a maximum value, equations (9) and (10) represent the lowest boundary operation frequency that guarantees a regulated output. If an operation frequency lower than those allowed by equations (9) and (10) is used, the output voltage will be lower than the desired first output voltage $V_{SP}$ and the second output voltage $V_{SN}$.

However, continuing to increase the operation frequency will eventually reach the limit of the period length. When the period $T_{BST}$ of the boost mode and the period $T_{BB}$ of the buck-boost mode are decreased, the sum of an on-time and an off-time will not be equal to a period. As a result, the condition of the discontinuous-conduction-mode is breached, and voltage stabilizing occurs between the boost mode and the buck-boost mode.

Sub-step 843: the processor 32 computes, based on the input voltage value, the first output voltage value, and the boost mode period ratio A, an upper boundary equation (11) of the boost mode in which operation frequency value $f_{SIDO}$ varies with the on-time.

$$f_{SIDO} \leq \frac{1}{A \cdot (T_{ON\_BST} + T_{OFF\_BST})} = \frac{V_{SP} - V_{IN}}{A \cdot T_{ON\_BST} V_{SP}} \qquad (11)$$

Sub-step 844: the processor 32 computes, based on the input voltage value, the second output voltage value, and the boost mode period ratio A, an upper boundary equation (12) of the buck-boost mode in which an operation frequency value $f_{SIDO}$ varies with the on-time.

$$f_{SIDO} \leq \frac{1}{(1-A) \cdot (T_{ON\_BB} + T_{OFF\_BB})} = \frac{|V_{SN}|}{(1-A) \cdot T_{ON\_BB} \cdot (|V_{SN}| + V_{IN})} \qquad (12)$$

Sub-step 845: the processor 32 further stores an upper limit of the on-time that is related to a current saturation limit of the inductor 23, the processor 32 further computes conversion power values of a range of value sets according to a conversion power algorithm, the range of value sets being defined by the lower boundary equation (9) of the boost mode, the lower boundary equation (10) of the buck-boost mode, the upper boundary equation (11) of the boost mode, the upper boundary equation (12) of the buck-boost mode and the upper limit of the on-time, and the processor 32 selects the value set having the highest conversion power for the on-time sum and the operation frequency value $f_{SIDO}$.

Figure 5:
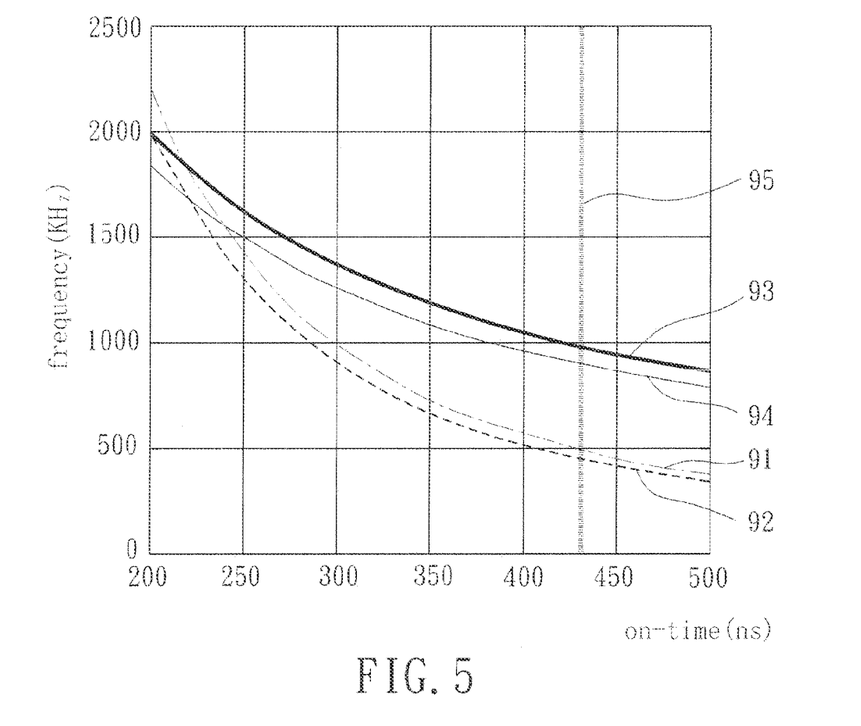
FIG. 5 is a graph illustrating the relationship between an operation frequency and an on-time.

Increasing the on-time non-stop will cause saturation of the current in the inductor 23. For instance, the saturation current in a 4.7 uH multilevel inductor is about 1.1 A, which limits the maximum on-time. FIG. 5 shows that the range of the operation frequency is confined by equation (9) (curve 91), equation (10) (curve 92), equation (11) (curve 93), equation (12) (curve 94), and the saturation current limit of the inductor (vertical line 95).

In this preferred embodiment, particular values of an input voltage $V_{IN}$, a first output voltage $V_{SP}$, a second output voltage $V_{SN}$ and a load are used to compute the upper and lower boundaries of the operation frequency, and then a fixed point root-finding method is used as the conversion power algorithm (but not limited to such) for selecting a value set that has the maximum conversion power.

Step 85: the processor 32 computes an on-time value of the boost mode and an on-time value of the buck-boost mode according to the on-time sum and the on-time ratio.

Step 86: the processor 32 controls the signal generator 31 based on the operation frequency value $f_{SIDO}$, the on-time value of the boost mode and the on-time value of the buck-boost mode, such that frequency and duty on-state ratio of the first control signal are related to the operation frequency value $f_{SIDO}$ and the on-time value of the boost mode, respectively and such that frequency and duty on-state ratio of the second control signal are related to the operation frequency value $f_{SIDO}$ and the on-time value of the buck-boost mode, respectively.

When operating in the boost mode, the processor controls the signal generator to configure the second control signal for turning off the second switch, and when operating in the buck-boost mode, the processor controls the signal generator to configure the first control signal for turning off the first switch. Step 87: When the requirements of any one of the input voltage $V_{IN}$, the first output voltage $V_{SP}$, and the second output voltage $V_{SN}$ are modified, steps 81 to 86 are repeated.

Figure 6:
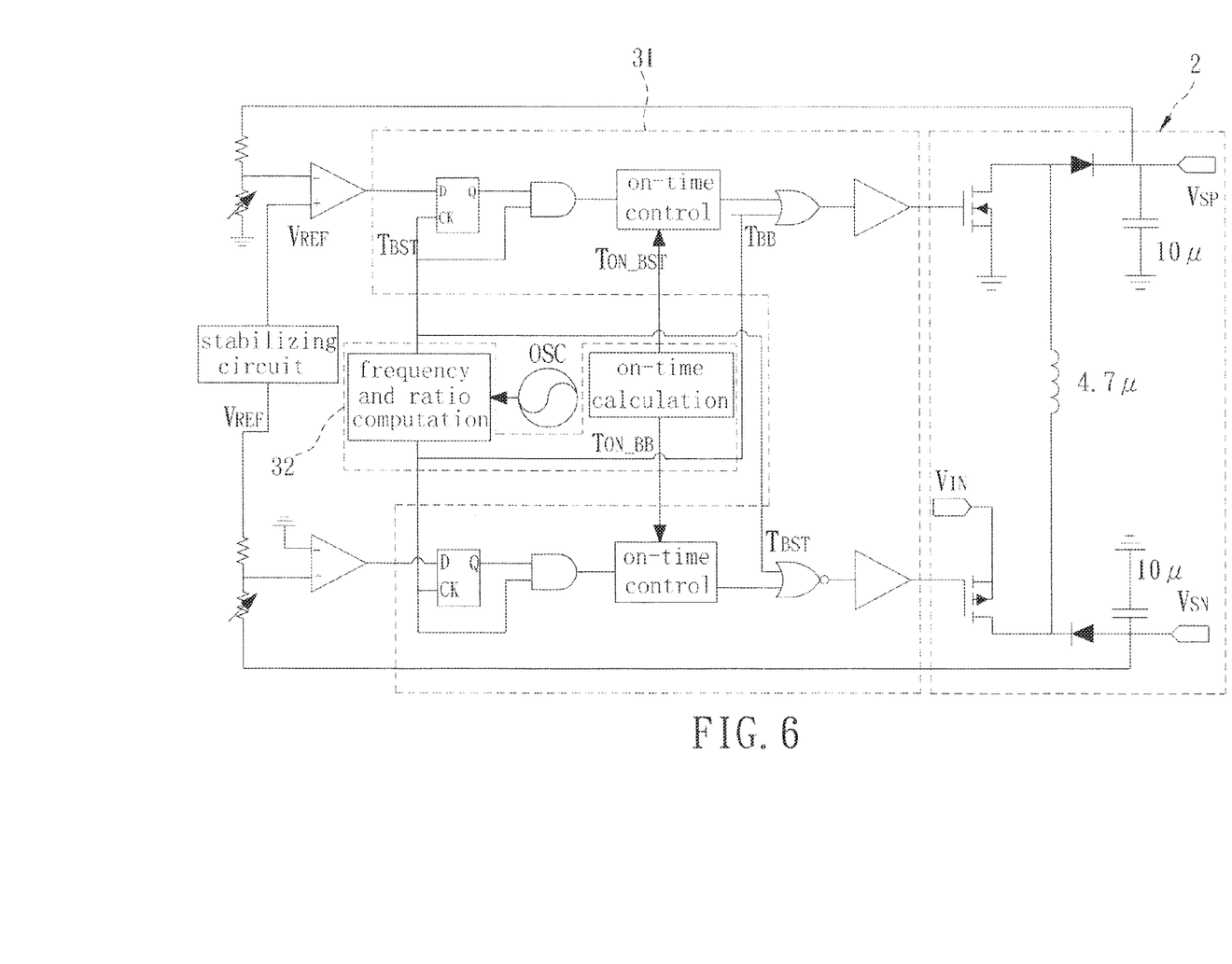
FIG. 6 is a schematic circuit diagram of a modified, circuit that operates similarly to the preferred embodiment illustrated in FIG. 1.

FIG. 6 shows a modified circuit that operates similarly to the preferred embodiment described above, and will not be further described herein.

Measurement Results:

In this preferred embodiment, the single-inductor-dual-output converter uses 0.11 um complementary metal-oxide-semiconductor manufacturing process and 1.6V+6V+32V components for manufacturing the thin film transistor liquid crystal display driver chip. The chip includes the switch control circuit 3 shown in FIG. 1.

Figure 7:
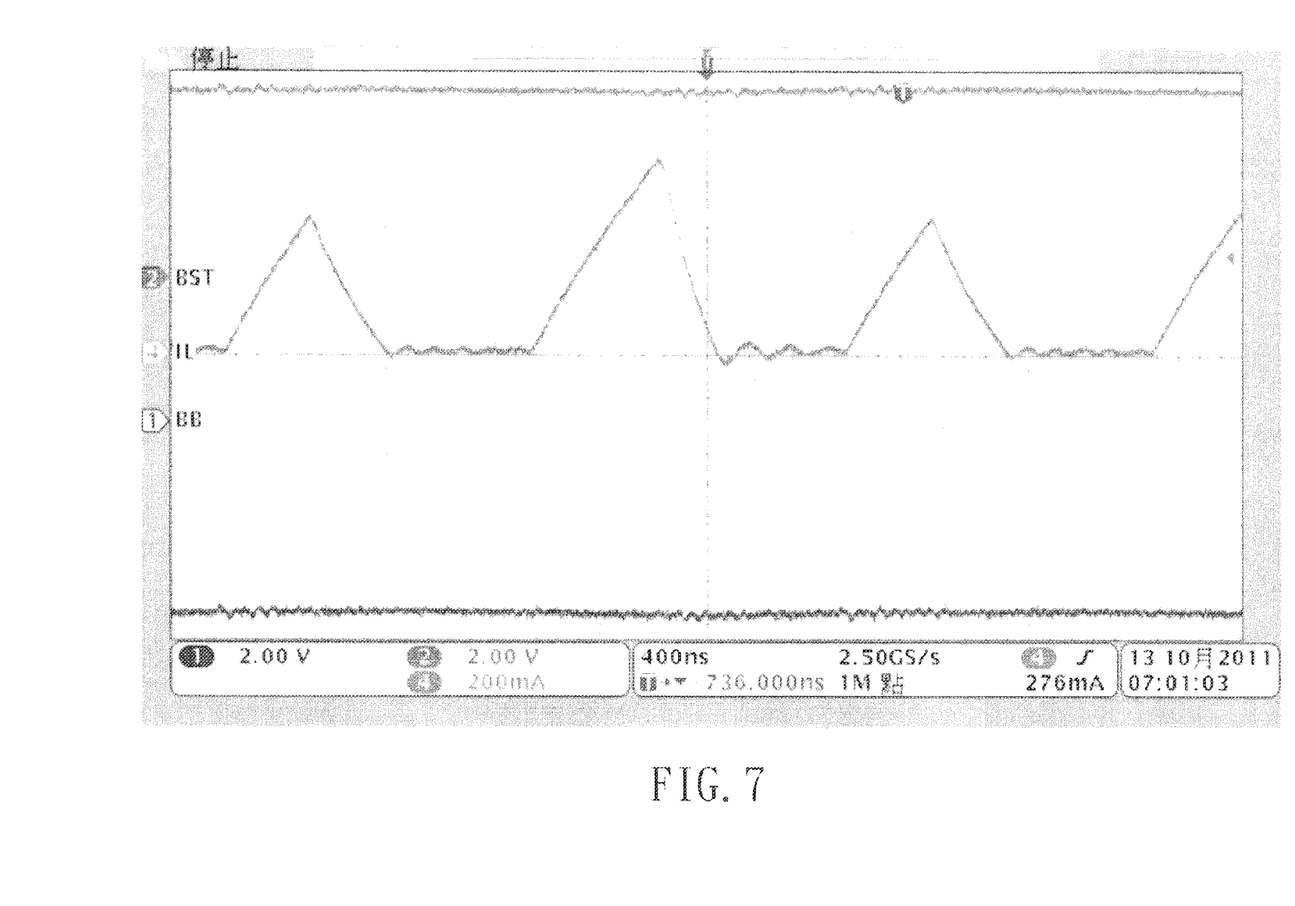
FIG. 7 is a waveform diagram illustrating the measured value of the current flowing through the inductor and the measured values of first and second output voltages.

FIG. 7 shows the amplitude of the current flowing through, the inductor, and the voltage ripples in the first output voltage $V_{SP}$ and the second, output voltage $V_{SN}$. The input voltage $V_{IN}$ is 2.8V, the first output voltage $V_{SP}$ (BST) is +5.3V, and the second output voltage $V_{SN}$ (BB) is −5.3V, fulfilling the output level requirement. In FIG. 7, the smaller peaks (the first and the third peaks) represent the current flowing through the inductor in the boost mode, and the larger peak (the second peak) represents the current flowing through the inductor in the buck-boost mode. Under the same load current (15 mA in this preferred embodiment), the buck-boost mode requires more on-time to compensate for its lower efficiency.

Figure 8:
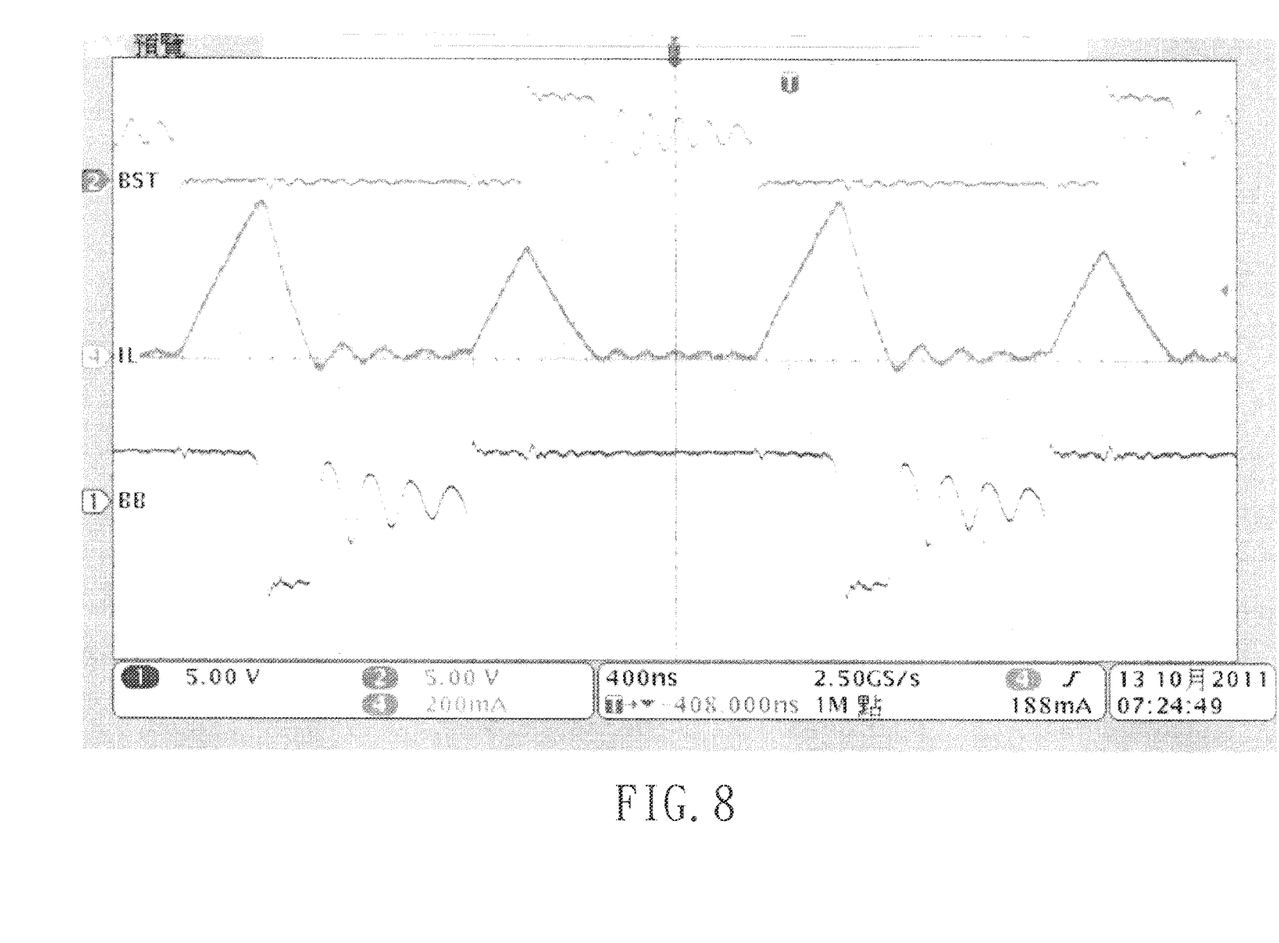
FIG. 8 is a waveform diagram illustrating the measured value of the current flowing through the inductor and the measured values of the first and the second output voltages at the switching nodes.

Referring to FIGS. 1 and 8, FIG. 8 shows the waveforms of the switching node between the inductor 23 and the first switch 24, and the switching node between the inductor 23 and the first switch 25. The operation of the discontinuous-conduction-mode (DCM) can be seen from the voltage waveforms of the BST and BB signals.

The present, invention has the following advantages:

1. In contrast with other types of single-inductor-dual-output converter that are controlled by current or voltage detection, the present invention employs digital control by computation, and integrates the switch control circuit 3 onto a single chip. The operation frequency and the on-time are computed by the processor to achieve optimized conversion efficiency in such, limited space.

2. Since the switch control circuit 3 is integrated onto a single chip, the paths between interfaces are shorter and thus the latency is significantly reduced, enabling quicker optimization of the operation frequency by computation.

3. Operation in the boundary mode provides the best output capability and a higher utilization of the inductor, and the period ratio can be based on the boundary mode conditions to reduce complexity in computations.

In summary, the present invention digitally computes the optimized operation frequency and the on-time, and can operate in a range for higher conversion efficiency.

While the present, invention has been described in connection with what is considered the most practical and preferred embodiment, it is understood that, this invention is not limited to the disclosed embodiment but is intended, to cover various arrangements included within the spirit and scope of the broadest interpretation so as to encompass all such modifications and equivalent arrangements.

What is claimed is:

1. A single-inductor-dual-output (SIDO) converter that is operable to switch between a boost mode and a buck-boost mode, the SIDO converter comprising:

an output circuit including a first output terminal for outputting a first output voltage, a second output terminal for outputting a second output voltage, an inductor electrically coupled with the first output terminal and the second output terminal, a first switch electrically coupled with the first output terminal, and a second switch electrically coupled with the second output terminal and disposed to receive an input voltage; and a switch control circuit including a signal generator electrically coupled with the output circuit, and a processor electrically coupled with the signal generator and the output circuit;

the signal generator generating a first control signal for controlling the first switch to switch between an on-state and an off-state, and a second control signal for controlling the second switch to switch between an on-state and an off state;

the processor detecting the input voltage, the first output voltage and the second output voltage to acquire an input voltage value related to the input voltage, a first output voltage value related, to the first output voltage, and a second output voltage value related to the second output voltage;

the processor computing an on-time ratio based on the input voltage value, the first output voltage value and the second output voltage value, wherein the on-time ratio is related to an on-time of the boost mode and an on-time of the buck-boost mode;

the processor having an output current value and an inductance value stored therein, computing an on-time sum based on the output current value, the inductance value, the input voltage value, the first output voltage value and the second output voltage value, and further computing an operation frequency value that corresponds to the on-time sum, wherein the on-time sum is substantially equal to a sum of the on-time of the boost mode and the on-time of the buck-boost mode;

the processor further computing an on-time value of the boost mode and an on-time value of the buck-boost mode based on the on-time sum and the on-time ratio;

the processor controlling the signal generator based on the operation frequency value, the on-time value of the boost mode and the on-time value of the buck-boost mode, such that frequency and duty on-state ratio of the first control signal are related to the operation frequency value and the on-time value of the boost mode, respectively and such that frequency and duty on-state ratio of the second control signal are related to the operation frequency value and the on-time value of the buck-boost mode, respectively.

2. The SIDO converter as claimed in claim 1, wherein:

when operating in the boost mode, the processor controls the signal generator to configure the second control signal for turning off the second switch; and when operating in the buck-boost mode, the processor controls the signal generator to configure the first control signal for turning off the first switch.

3. The SIDO converter as claimed in claim 2, wherein the processor computes the on-time ratio according to:

$$\frac{T_{ON\_BST}}{T_{ON\_BB}} = \sqrt{\frac{V_{SP} - V_{IN}}{|V_{SN}|}},$$

$T_{ON\_BST}$ being the on-time value of the boost mode, $T_{ON\_BB}$ being the on-time value of the buck-boost mode, $V_{SP}$ being the first output voltage value, $V_{SN}$ being the second output voltage value, and $V_{IN}$ being the input voltage value.

4. The SIDO converter as claimed in claim 3, wherein:
the processor further computes a boost mode period ratio according to the input voltage value and the first output voltage value, the boost mode period, ratio being related to a period of the boost, mode and a period, of the buck-boost mode;
the output current value includes a maximum output current value of the boost mode and a maximum output-current value of the buck-boost mode;
the processor further computes, based on the maximum output current value of the boost mode, the inductance value, the input voltage value, the first output, voltage value, and the boost mode period ratio, a lower boundary equation of the boost mode in which an operation frequency value varies with the on-time;
the processor further computes, based on the maximum output current value of the buck-boost mode, the inductance value, the input voltage value, the second output voltage value, and the boost mode period ratio, a lower boundary equation of the buck-boost mode in which an operation frequency value varies with the on-time;
the processor further computes, based on the input voltage value, the first output voltage value, and the boost mode period, ratio, an upper boundary equation of the boost mode in which an operation frequency value varies with the on-time;
the processor further computes, based on the input voltage value, the second output voltage value, and the boost mode period ratio, an upper boundary equation of the buck-boost mode in which an operation frequency value varies with the on-time;
the processor further stores an upper limit of the on-time that is related to a current saturation limit of the inductor;
the processor further computes conversion power values of a range of value sets according to a conversion power algorithm, the range of value sets being defined by the lower boundary equation of the boost mode, the lower boundary equation of the buck-boost mode, the upper boundary equation of the boost mode, the upper boundary equation of the buck-boost mode and the upper limit of the on-time; and
the processor selects the value set having the highest conversion power for the on-time sum and the operation frequency value.

5. The SIDO converter as claimed in claim 4, wherein the processor computes the boost mode period ratio (A) according to:

$$A = \frac{T_{BST}}{T_{BST} + T_{BB}}, \text{ and}$$

$$\frac{T_{BST}}{T_{BB}} = \frac{T_{ON\_BST} + T_{OFF\_BST}}{T_{ON\_BB} + T_{OFF\_BB}} = \frac{V_{SP}^{3/2}}{(V_{SP} + V_{IN})\sqrt{V_{SP} - V_{IN}}},$$

$T_{BST}$ being a period of the boost mode, $T_{BB}$ being a period of the buck-boost mode, $T_{OFF\_BST}$ being an off-time of the boost mode, and $T_{OFF\_BB}$ being an off-time of the buck-boost mode.

6. The SIDO converter as claimed in claim 5, wherein the lower boundary equation of the boost mode, the lower boundary equation of the buck-boost mode, the upper boundary equation of the boost mode and the upper boundary equation of the buck-boost mode are:

$$f_{SIDO} \geq f_{BST} = \frac{2I_{BST}L \cdot (V_{SP} - V_{IN})}{A \cdot T_{ON\_BST}^2 V_{IN}^2}$$

$$f_{SIDO} \geq f_{BB} = \frac{2I_{BB}L \cdot |V_{SN}|}{(1-A) \cdot T_{ON\_BB}^2 V_{IN}^2}$$

$$f_{SIDO} \leq \frac{1}{A \cdot (T_{ON\_BST} + T_{OFF\_BST})} = \frac{V_{SP} - V_{IN}}{A \cdot T_{ON\_BST} V_{SP}}$$

$$f_{SIDO} \leq \frac{1}{(1-A) \cdot (T_{ON\_BB} + T_{OFF\_BB})} = \frac{|V_{SN}|}{(1-A) \cdot T_{ON\_BB} \cdot (|V_{SN}| + V_{IN})}$$

$f_{SIDO}$ being the operation frequency of the SIDO converter, $f_{BST}$ being the operation frequency of the boost mode, $f_{BB}$ being the operation frequency of the buck-boost mode, $I_{BST}$ being the maximum output current of the boost mode, $I_{BB}$ being the maximum output current of the buck-boost mode, and L being the inductance value of the inductor.

7. A switch control circuit adapted for a single-inductor-dual-output (SIDO) converter that is operable to switch between a boost mode and a buck-boost mode, the SIDO converter receiving an input voltage and outputting a first output voltage and a second output voltage, the SIDO converter including an inductor, a first switch controlled by a first control signal and a second switch controlled by a second control signal, the switch control circuit comprising:
a signal generator for generating the first control signal used to control the first switch to switch between an on-state and an off-state, and for generating the second control signal used to control the second switch to switch between an on-state and an off state; and
a processor electrically coupled with the signal generator and computing an on-time ratio based on an input voltage value related to the input voltage, a first output voltage value related to the first output voltage, and a second output voltage value related to the second output voltage, wherein the on-time ratio is related to an on-time of the boost, mode and an on-time of the buck-boost mode;
the processor having an output current value and an inductance value stored, therein, computing an on-time sum based on the output current value, the inductance value, the input voltage value, the first output voltage value and the second output voltage value, and further computing an operation frequency value that corresponds to the on-time sum, wherein the on-time sum is substantially equal to a sum of the on-time of the boost mode and the on-time of the buck-boost mode;
the processor further computing an on-time value of the boost mode and an on-time value of the buck-boost mode based on the on-time sum and the on-time ratio;
the processor controlling the signal generator based on the operation frequency value, the on-time value of the boost mode and the on-time value of the buck-boost mode, such that frequency and duty on-state ratio of the first control signal are related to the operation frequency value and the on-time value of the boost mode, respectively and such that frequency and duty on-state ratio of the second control signal are related to the operation frequency value and the on-time value of the buck-boost mode, respectively.

8. The switch control circuit as claimed in claim 7, wherein:
when operating in the boost mode, the processor controls the signal generator to configure the second control signal for turning off the second switch; and when operating in the buck-boost mode, the processor controls the signal generator to configure the first control signal for turning off the first switch.

9. The switch control circuit as claimed in claim 8, wherein the processor computes the on-time ratio according to:

$$\frac{T_{ON\_BST}}{T_{ON\_BB}} = \sqrt{\frac{V_{SP} - V_{IN}}{|V_{SN}|}},$$

$T_{ON\_BST}$ being the on-time value of the boost mode, on $T_{ON\_BB}$ being the on-time value of the buck-boost mode, $V_{SP}$ being the first output voltage value, $V_{SN}$ being the second output voltage value, and $V_{IN}$ being the input voltage value.

10. The switch control circuit as claimed in claim 9, wherein:

the processor further computes a boost mode period ratio according to the input voltage value and the first output voltage value, the boost mode period ratio being related to a period of the boost mode and a period of the buck-boost mode;

the output current value includes a maximum output current value of the boost mode and a maximum output current value of the buck-boost mode;

the processor further computes, based on the maximum output current value of the boost mode, the inductance value, the input voltage value, the first output voltage value, and the boost mode period ratio, a lower boundary equation of the boost mode in which an operation frequency value varies with the on-time;

the processor further computes, based on the maximum output current value of the buck-boost mode, the inductance value, the input voltage value, the second output voltage value, and the boost mode period ratio, a lower boundary equation of the buck-boost mode in which an operation frequency value varies with the on-time;

the processor further computes, based on the input-voltage value, the first output voltage value, and the boost mode period ratio, an upper boundary equation of the boost mode in which an operation frequency value varies with the on-time;

the processor further computes, based on the input voltage value, the second output voltage value, and the boost mode period ratio, an upper boundary equation of the buck-boost mode in which an operation frequency value varies with the on-time;

the processor further stores an upper limit of the on-time that is related to a current saturation limit of the inductor;

the processor further computes conversion power values of a range of value sets according to a conversion power algorithm, the range of value sets being defined by the lower boundary equation of the boost mode, the lower boundary equation of the buck-boost mode, the upper boundary equation of the boost mode, the upper boundary equation of the buck-boost mode and the upper limit of the on-time; and the processor selects the value set having the highest conversion power for the on-time sum and the operation frequency value.

11. The switch control circuit as claimed in claim 10, wherein the processor computes the boost mode period ratio (A) according to:

$$A = \frac{T_{BST}}{T_{BST} + T_{BB}}, \text{ and}$$

$$\frac{T_{BST}}{T_{BB}} = \frac{T_{ON\_BST} + T_{OFF\_BST}}{T_{ON\_BB} + T_{OFF\_BB}} = \frac{V_{SP}^{3/2}}{(V_{SP} + V_{IN})\sqrt{V_{SP} - V_{IN}}},$$

$T_{BST}$ being a period of the boost mode, $T_{BB}$ being a period of the buck-boost mode, $T_{OFF\_BST}$ being an off-time of the boost mode, and off $T_{OFF\_BB}$ being an off-time of the buck-boost mode.

12. The switch control circuit as claimed in claim 11, wherein the lower boundary equation of the boost mode, the lower boundary equation of the buck-boost mode, the upper boundary equation of the boost mode and the upper boundary equation of the buck-boost mode are:

$$f_{SIDO} \geq f_{BST} = \frac{2I_{BST}L \cdot (V_{SP} - V_{IN})}{A \cdot T_{ON\_BST}^2 V_{IN}^2}$$

$$f_{SIDO} \geq f_{BB} = \frac{2I_{BB}L \cdot |V_{SN}|}{(1-A) \cdot T_{ON\_BB}^2 V_{IN}^2}$$

$$f_{SIDO} \leq \frac{1}{A \cdot (T_{ON\_BST} + T_{OFF\_BST})} = \frac{V_{SP} - V_{IN}}{A \cdot T_{ON\_BST} V_{SP}}$$

$$f_{SIDO} \leq \frac{1}{(1-A) \cdot (T_{ON\_BB} + T_{OFF\_BB})} = \frac{|V_{SN}|}{(1-A) \cdot T_{ON\_BB} \cdot (|V_{SN}| + V_{IN})}$$

$f_{SIDO}$ being the operation frequency of the SIDO converter, $f_{BST}$ being the operation frequency of the boost mode, $f_{BB}$ being the operation frequency of the buck-boost mode, $f_{BST}$ being the maximum output current of the boost mode, $f_{BB}$ being the maximum output current of the buck-boost mode, and L being the inductance value of the inductor.

13. The switch control circuit as claimed in claim 8, wherein the processor detects the input voltage, the first output voltage and the second output voltage to acquire the input voltage value related to the input voltage, the first output voltage value related to the first output voltage, and the second output voltage value related to the second output voltage.

14. A single-inductor-dual-output (SIDO) control method, comprising the following steps:

(A) computing an on-time ratio based on an input voltage value, a first output voltage value and a second output voltage value, wherein the on-time ratio is related to an on-time of a boost mode and an on-time of a buck-boost mode;

(B) computing an on-time sum based on a stored output current value, a stored, inductance value, the input voltage value, the first output voltage value and the second output voltage value, and computing an operation frequency value that corresponds to the on-time sum, wherein the on-time sum is substantially equal to a sum of the on-time of the boost mode and the on-time of the buck-boost mode; and (C) computing an on-time value of the boost mode and an on-time value of the buck-boost mode based on the on-time sum and the on-time ratio.

15. The SIDO method as claimed in claim 14, wherein, in step (A), the on-time ratio is computed according to:

$$\frac{T_{ON\_BST}}{T_{ON\_BB}} = \sqrt{\frac{V_{SP} - V_{IN}}{|V_{SN}|}},$$

$T_{ON\_BST}$ being the on-time value of the boost, mode, $T_{ON\_BB}$ being the on-time value or the buck-boost mode, $V_{SP}$ being the first output voltage value, $V_{SN}$ being the second output voltage value, and $V_{IN}$ being the input voltage value.

16. The SIDO method as claimed in claim 15, wherein:
step (A) further includes computing a boost mode period ratio according to the input voltage value and the first output voltage value, the boost mode period ratio being related to a period of the boost mode and a period of the buck-boost mode;
the output current value in step (B) includes a maximum output, current value of the boost mode and a maximum output current value of the buck-boost mode; and
step (B) includes:
(B1) computing, based on the maximum output current value of the boost mode, the inductance value, the input voltage value, the first output voltage value, and the boost mode period ratio, a lower boundary equation of the boost mode in which an operation frequency value varies with the on-time;
(B2) computing, based on the maximum output current value of the buck-boost mode, the inductance value, the input voltage value, the second output voltage value, and the boost mode period ratio, a lower boundary equation of the buck-boost mode in which an operation frequency value varies with the on-time;
(B3) computing, based on the input voltage value, the first output voltage value, and the boost, mode period ratio, an upper boundary equation of the boost mode in which an operation frequency value varies with the on-time;
(B4) computing, based on the input voltage value, the second output voltage value, and the boost mode period ratio, an upper boundary equation of the buck-boost mode in which an operation frequency value varies with the on-time;
(B5) computing conversion power values of a range of value sets according to a conversion power algorithm, the range of value sets being defined by the lower-boundary equation of the boost mode, the lower boundary equation of the buck-boost mode, the upper boundary equation of the boost mode, the upper boundary equation of the buck-boost mode and an upper limit of the on-time that is related to a current saturation limit of the inductor; and
(B6) selecting the value set having the highest conversion power for the on-time sum and the operation frequency value.

17. The SIDO control method as claimed in claim 16, wherein the boost mode period ratio (A) is computed according to:

$$A = \frac{T_{BST}}{T_{BST} + T_{BB}}, \text{ and}$$

$$\frac{T_{BST}}{T_{BB}} = \frac{T_{ON\_BST} + T_{OFF\_BST}}{T_{ON\_BB} + T_{OFF\_BB}} = \frac{V_{SP}^{3/2}}{(V_{SP} + V_{IN})\sqrt{V_{SP} - V_{IN}}},$$

$T_{BST}$ being a period of the boost mode, $T_{BB}$ being a period of the buck-boost mode, $T_{OFF\_BST}$ being an off-time of the boost mode, and $T_{OFF\_BB}$ being an off-time of the buck-boost mode.

18. The SIDO control method as claimed in claim 17, wherein the lower boundary equation of the boost mode, the lower boundary equation of the buck-boost mode, the upper boundary equation of the boost mode and the upper boundary equation of the buck-boost mode are:

$$f_{SIDO} \geq f_{BST} = \frac{2I_{BST}L \cdot (V_{SP} - V_{IN})}{A \cdot T_{ON\_BST}^2 V_{IN}^2}$$

$$f_{SIDO} \geq f_{BB} = \frac{2I_{BB}L \cdot |V_{SN}|}{(1-A) \cdot T_{ON\_BB}^2 V_{IN}^2}$$

$$f_{SIDO} \leq \frac{1}{A \cdot (T_{ON\_BST} + T_{OFF\_BST})} = \frac{V_{SP} - V_{IN}}{A \cdot T_{ON\_BST} V_{SP}}$$

$$f_{SIDO} \leq \frac{1}{(1-A) \cdot (T_{ON\_BB} + T_{OFF\_BB})} = \frac{|V_{SN}|}{(1-A) \cdot T_{ON\_BB} \cdot (|V_{SN}| + V_{IN})}$$

$f_{SIDO}$ being the operation frequency of a SIDO converter, $f_{BST}$ being the operation frequency or the Boost mode, $f_{BB}$ being the operation frequency of the buck-boost mode, $I_{BST}$ being the maximum output current of the boost mode, $I_{BB}$ being the maximum output current or the buck-boost mode, and L being the inductance value of the inductor.

\* \* \* \* \*